US012269469B2

(12) United States Patent
Sato et al.

(10) Patent No.: US 12,269,469 B2
(45) Date of Patent: Apr. 8, 2025

(54) VEHICLE DRIVE ASSIST APPARATUS

(71) Applicant: SUBARU CORPORATION, Tokyo (JP)

(72) Inventors: Seiya Sato, Tokyo (JP); Shota Yasuda, Tokyo (JP); Shigeki Mukai, Tokyo (JP); Kazuyuki Takahashi, Tokyo (JP); Wataru Munemura, Tokyo (JP); Hiroaki Kuramochi, Tokyo (JP); Hiroki Maniwa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 206 days.

(21) Appl. No.: 18/149,277

(22) Filed: Jan. 3, 2023

(65) Prior Publication Data

US 2023/0234571 A1 Jul. 27, 2023

(30) Foreign Application Priority Data

Jan. 21, 2022 (JP) .................................. 2022-008109

(51) Int. Cl.
*B60W 30/09* (2012.01)
*B60W 50/14* (2020.01)
*G06V 10/44* (2022.01)
*G06V 20/58* (2022.01)
*G06V 20/56* (2022.01)

(52) U.S. Cl.
CPC ............ *B60W 30/09* (2013.01); *B60W 50/14* (2013.01); *G06V 10/44* (2022.01); *G06V 20/58* (2022.01); *B60W 2050/143* (2013.01); *B60W 2050/146* (2013.01); *B60W 2420/403* (2013.01);
(Continued)

(58) Field of Classification Search
CPC ................ B60W 30/09; B60W 50/14; B60W 2050/143; B60W 2050/146; B60W 2420/403; B60W 2554/404; B60W 2710/18; B60W 2554/00; B60W 30/0956; G06V 10/44; G06V 20/58; G06V 20/588
See application file for complete search history.

(56) References Cited

U.S. PATENT DOCUMENTS 10,713,508 B1 * 7/2020 Diehl ...................... G01S 17/66
2012/0203436 A1 * 8/2012 Braennstroem ........... B60T 7/22
701/1

FOREIGN PATENT DOCUMENTS

JP 2019-018733 A 2/2019

* cited by examiner

*Primary Examiner* — Ashley L Redhead, Jr.
(74) *Attorney, Agent, or Firm* — Rimon P.C.

(57) ABSTRACT

A vehicle drive assist apparatus to be applied to a vehicle executes at least emergency braking control for avoiding collision of the vehicle with a recognized object. The vehicle drive assist apparatus includes a surrounding environment recognition device and a traveling control unit. The surrounding environment recognition device includes a recognizer that recognizes a surrounding environment around the vehicle, and a feature information acquirer that acquires feature information of a target object in the recognized surrounding environment. The traveling control unit centrally controls the entire vehicle. The traveling control unit includes a determiner that determines, based on the acquired feature information, whether the target object has a possibility of hindering traveling of the vehicle. The traveling control unit continues normal traveling control for the vehicle when the target object is determined to have no possibility of hindering the traveling of the vehicle.

14 Claims, 4 Drawing Sheets

(52) U.S. Cl.
CPC ... *B60W 2554/404* (2020.02); *B60W 2710/18* (2013.01); *G06V 20/588* (2022.01)

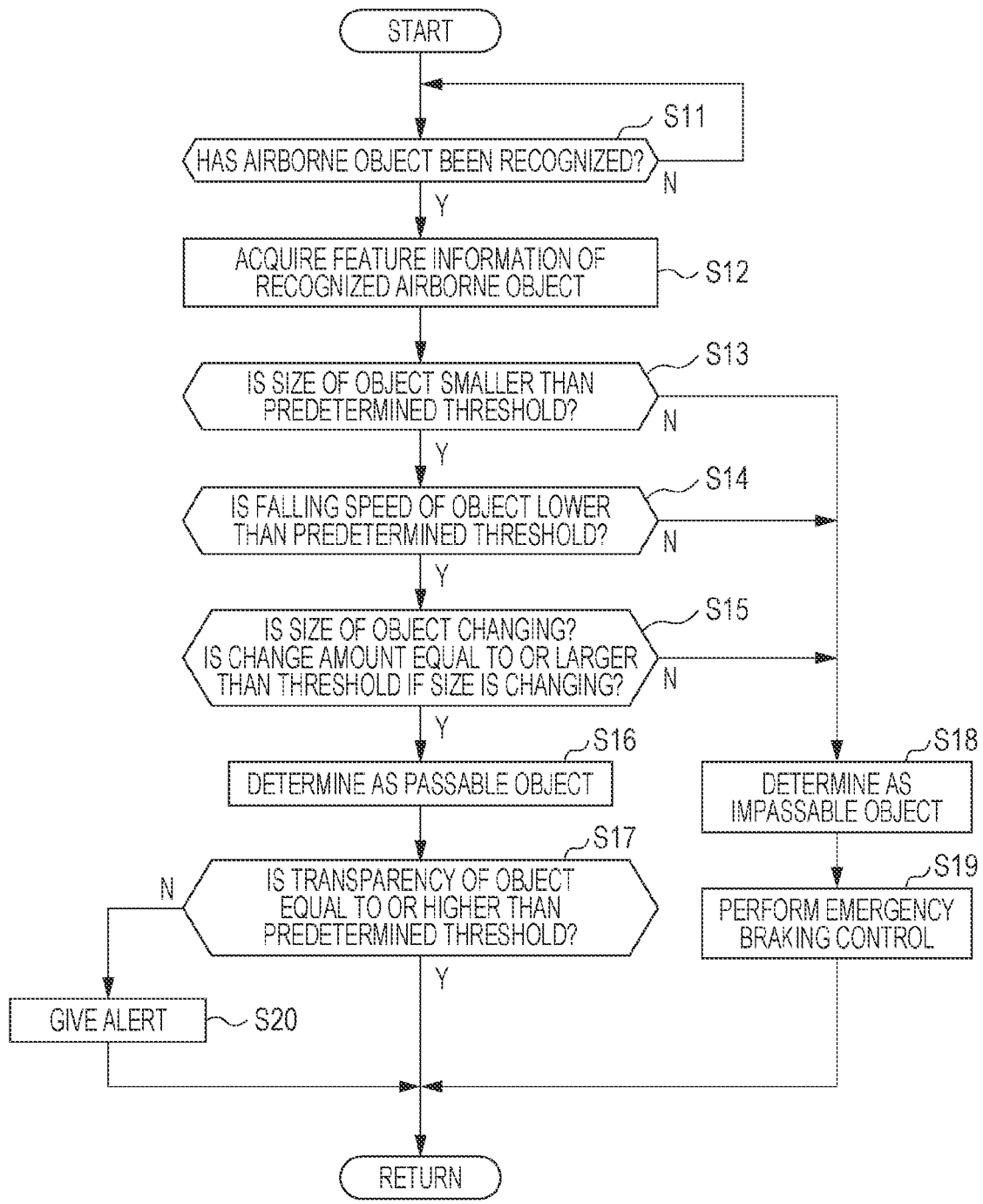

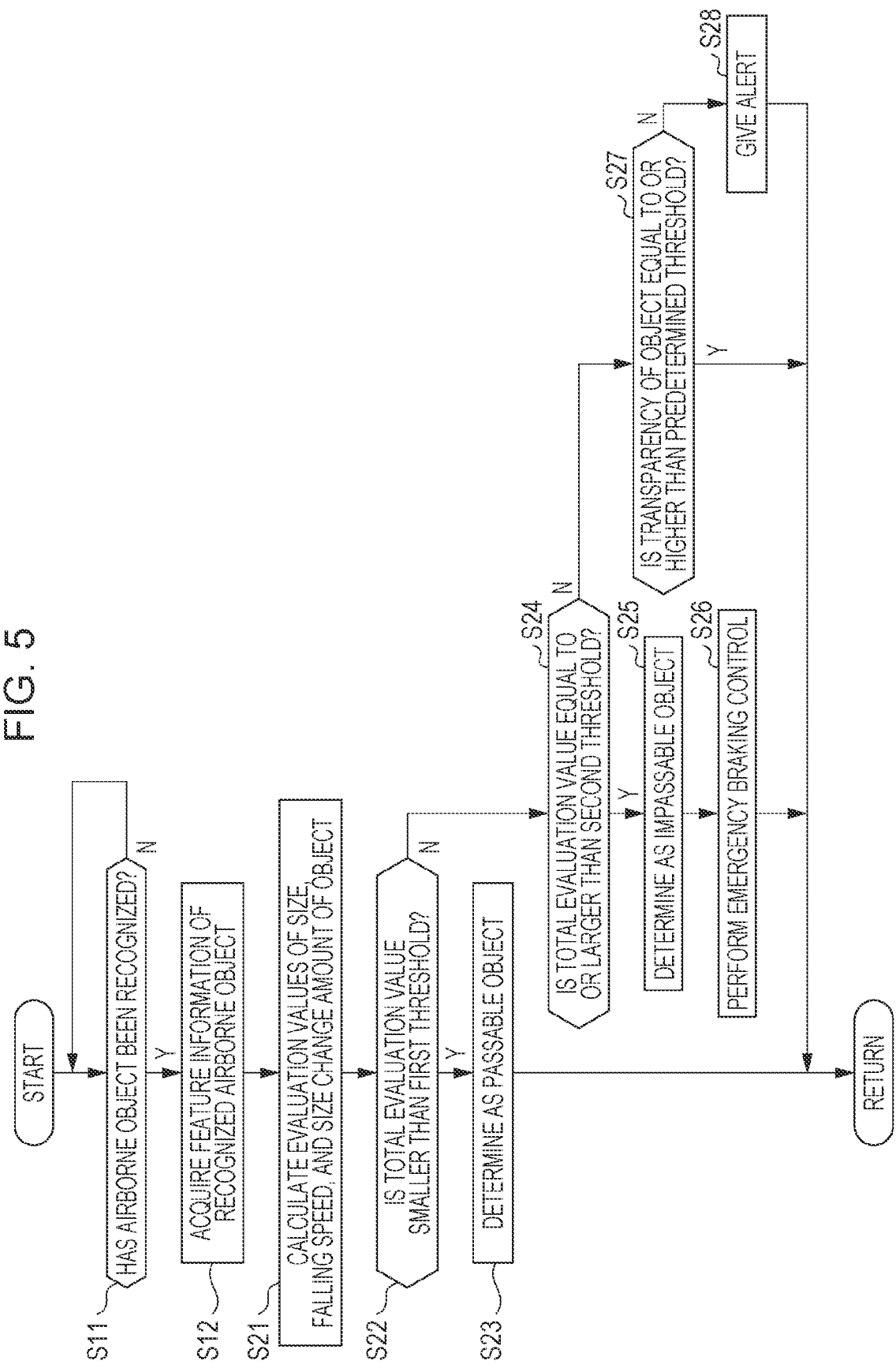

VEHICLE DRIVE ASSIST APPARATUS

CROSS-REFERENCE TO RELATED APPLICATIONS

The present application claims priority from Japanese Patent Application No. 2022-008109 filed on Jan. 21, 2022, the entire contents of which are hereby incorporated by reference.

BACKGROUND

The disclosure relates to a vehicle drive assist apparatus that performs drive assist control for avoiding collision with an obstacle or the like based on surrounding environment information acquired by using an on-board camera device and the like.

In the field of vehicles such as automobiles, autonomous driving control technologies have been developed to cause the vehicles to autonomously travel without driving operations of drivers who drive the vehicles. Various drive assist apparatuses using the autonomous driving control technologies have been proposed and put into practical use to perform various types of traveling control for assisting driving operations of drivers.

Related-art drive assist apparatuses use sensing devices such as an on-board camera device and an on-board radar device as a surrounding environment recognition device that recognizes the surrounding environment around a vehicle and acquires the surrounding environment as surrounding information. The on-board camera device recognizes the surrounding environment around the vehicle based on acquired image data. The on-board radar device recognizes the surrounding environment around the vehicle by outputting radio waves to the surroundings of the vehicle, receiving the reflected radio waves from objects, and analyzing the received radio waves.

Each related-art drive assist apparatus causes the vehicle to travel while recognizing the surrounding environment around the vehicle by using the sensing devices. For example, when an obstacle that may hinder the traveling of the vehicle is recognized on a traveling path of the vehicle, emergency braking control or emergency steering control is performed to prevent collision between the vehicle and the obstacle. Thus, the vehicle can continue to travel safely. The control technology such as a drive assist apparatus having an obstacle avoidance control function for avoiding collision with an obstacle has variously been proposed and put into practical use as in, for example, Japanese Unexamined Patent Application Publication No. 2019-18733.

SUMMARY

An aspect of the disclosure provides a vehicle drive assist apparatus to be applied to a vehicle. The vehicle drive assist apparatus is configured to execute at least emergency braking control for avoiding collision of the vehicle with a recognized object. The vehicle drive assist apparatus includes a surrounding environment recognition device and a traveling control unit. The surrounding environment recognition device includes a recognizer and a feature information acquirer. The recognizer is configured to recognize a surrounding environment around the vehicle. The feature information acquirer is configured to acquire feature information of a target object in the recognized surrounding environment. The traveling control unit is configured to centrally control a whole of the vehicle. The traveling control unit includes a determiner configured to determine, based on the acquired feature information, whether the target object has a possibility of hindering traveling of the vehicle. The traveling control unit is configured to continue normal traveling control for the vehicle when target object does is determined to have no possibility of hindering the traveling of the vehicle.

An aspect of the disclosure provides a vehicle drive assist apparatus to be applied to a vehicle. The vehicle drive assist apparatus is configured to execute at least emergency braking control for avoiding collision of the vehicle with a recognized object. The vehicle drive assist apparatus includes a surrounding environment recognition device and circuitry. The surrounding environment recognition device has a sensor and is configured to recognize a surrounding environment around the vehicle. The detector is configured to acquire feature information of a target object in the recognized surrounding environment. The circuitry is configured to centrally control a whole of the vehicle. The circuitry is configured to, based on the acquired feature information, determine whether the target object has a possibility of hindering traveling of the vehicle. The circuitry is configured to, upon determining that the target object is has no possibility of hindering the traveling of the vehicle, continue normal traveling control for the vehicle.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to describe the principles of the disclosure.

FIG. 4 is a flowchart illustrating a flow of operations of the drive assist apparatus according to the embodiment of the disclosure; and FIG. 5 is a flowchart illustrating a flow of operations of a drive assist apparatus according to an embodiment of the disclosure.

DETAILED DESCRIPTION

Figure 1:
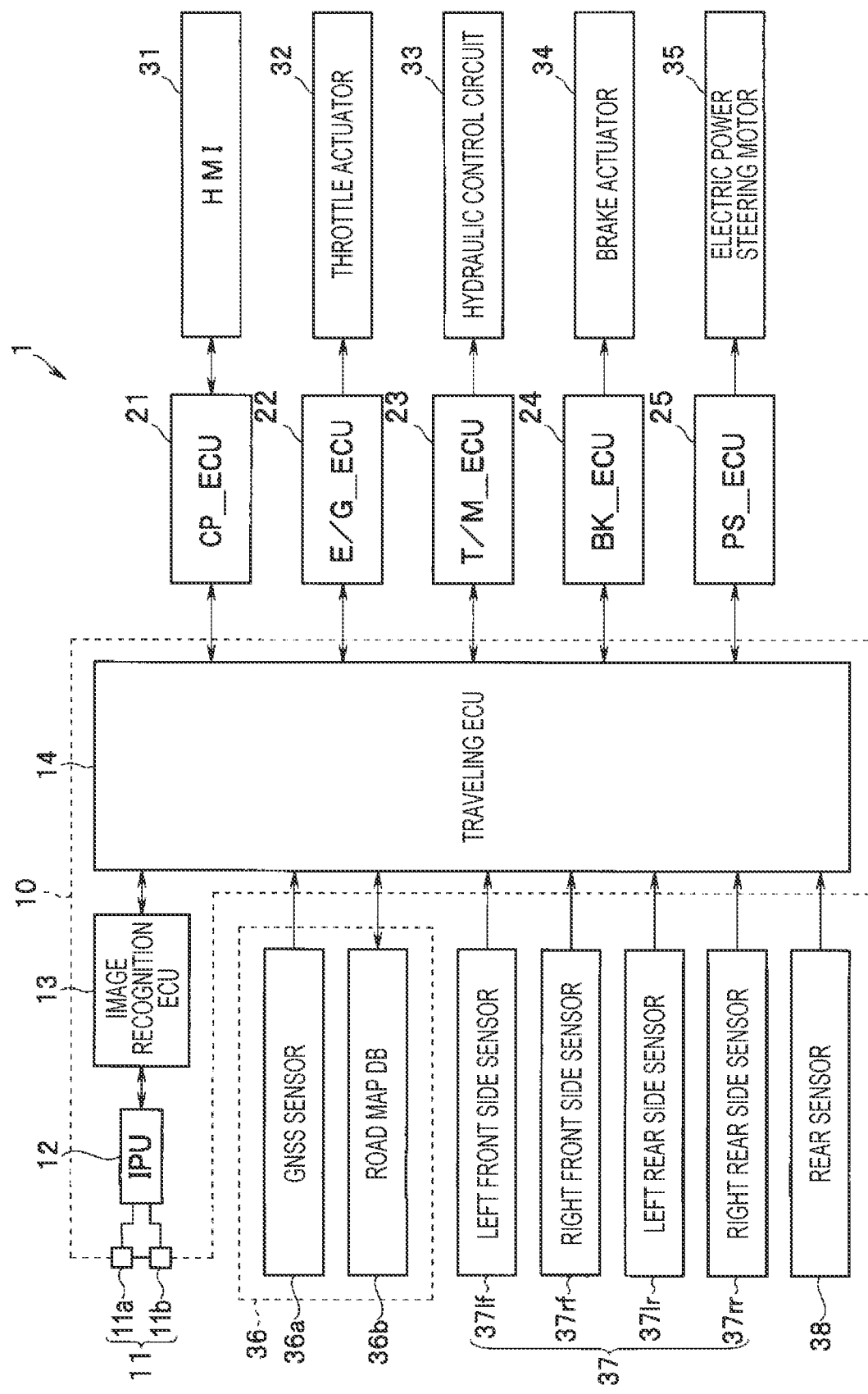
FIG. 1 is a block diagram illustrating a schematic configuration of a drive assist apparatus according to an embodiment of the disclosure.

Examples of the objects to be recognized by the related-art drive assist apparatus include various road marks such as lane lines and planar structures such as manholes (hereinafter referred to simply as "lane lines etc."). There are three-dimensional objects on roads, such as permanently installed stationary objects typified by roadside curbstones, guardrails, traffic signs, utility poles, and billboards, and moving objects typified by pedestrians, bicycles, other vehicles, and animals.

Further, there are various three-dimensional objects on roads, such as temporarily installed stationary objects typified by signage and traffic cones near construction sites, and objects that have fallen from luggage spaces of other vehicles (hereinafter referred to collectively as "obstacles etc.").

For example, empty plastic bags may float in the air due to wind or the like because of their small mass (hereinafter referred to as "airborne objects"). The surrounding environment recognition device of the drive assist apparatus may recognize the various objects described above.

When a three-dimensional object that satisfies a predetermined condition among the various objects described above is recognized on the traveling path of the vehicle, the related-art drive assist apparatus recognizes the three-dimensional object as an object that may hinder the traveling of the vehicle. In this case, obstacle avoidance control including emergency braking control or emergency steering control is executed to avoid collision with the recognized obstacle.

The related-art drive assist apparatus may execute predetermined obstacle avoidance control even if the recognized object is, for example, the airborne object.

The airborne object is unlikely to hinder the traveling of the vehicle. When the airborne object is recognized and an obstacle avoidance action is executed, the driver of the vehicle may have discomfort.

It is desirable to provide a vehicle drive assist apparatus configured to perform drive assist control for avoiding collision with obstacles etc. based on surrounding environment information acquired by using an on-board camera device and the like, and configured not to immediately execute obstacle avoidance control including emergency braking control when an airborne object or the like is recognized during traveling of a vehicle, thereby constantly executing smooth traveling control without causing driver's discomfort.

Embodiments of the disclosure are described below. The drawings for use in the following description are schematic drawings. To illustrate constituent elements in recognizable sizes in the drawings, dimensional relationships and scales of members may be varied among the constituent elements. The embodiments of the disclosure are not limited to the embodiments in the drawings in terms of the numbers, shapes, size ratios, and relative positional relationships of the constituent elements in the drawings. Throughout the present specification and the drawings, elements having substantially the same function and configuration are denoted with the same numerals to avoid any redundant description.

The schematic configuration of a drive assist apparatus according to a first embodiment of the disclosure is described with reference to FIG. 1. FIG. 1 is a block diagram illustrating the schematic configuration of the drive assist apparatus according to the first embodiment of the disclosure. As illustrated in FIG. 1, a drive assist apparatus 1 of this embodiment basically has a configuration substantially similar to those of related-art drive assist apparatuses of the same type. Therefore, the following description is overall description of the drive assist apparatus 1 of this embodiment.

The drive assist apparatus 1 of this embodiment includes a camera unit 10 fixed to an upper central part of a front area in a cabin of a vehicle including the drive assist apparatus 1 (hereinafter referred to simply as "vehicle"). In one embodiment, the camera unit 10 may serve as an on-board camera device.

The camera unit 10 includes a stereo camera 11, an image processing unit (IPU) 12, an image recognition unit (image recognition ECU) 13, and a traveling control unit (traveling ECU) 14.

In one embodiment, the stereo camera 11 is a device that may serve as a recognizer configured to recognize a surrounding environment around a vehicle. The stereo camera 11 includes a main camera 11a and a subcamera 11b. For example, the main camera 11a and the subcamera 11b are disposed in the cabin of the vehicle at bilaterally symmetrical positions across the center in a vehicle width direction to face a forward side (in the traveling direction). For example, the main camera 11a and the subcamera 11b each include a CMOS image sensor, and generate a stereoscopic image by acquiring two images of a surrounding environment in an external forward area within a predetermined range from different viewpoints in every predetermined synchronous imaging period.

The IPU 12 performs predetermined image processing for surrounding environment image data obtained by the stereo camera 11 (image data showing the surrounding environment during traveling of the vehicle) to detect edges of various target objects such as objects in the image and lane lines on a road surface. Thus, the IPU 12 recognizes the three-dimensional objects and the lane lines around the vehicle. The IPU 12 acquires distance information from positional deviation amounts of corresponding edges in the right and left images, and generates image information including the distance information (distance image information).

The image recognition ECU 13 obtains, based on the distance image information received from the IPU 12, a road curvature [1/m] between right and left lane lines of a road where the vehicle is traveling (vehicle traveling road) and a width between the right and left lane lines (lane width). Various methods are known to obtain the road curvature and the lane width. For example, the image recognition ECU 13 obtains the road curvature in such a manner that right and left lane lines are recognized by binarization using a difference in brightness levels based on surrounding environment information and the curvatures of the right and left lane lines are obtained for each predetermined section by using a curve approximation expression based on the least-square method. The image recognition ECU 13 calculates the lane width from a difference in the curvatures of the right and left lane lines.

The image recognition ECU 13 calculates, based on the curvatures of the right and left lane lines and the lane width, a vehicle lateral position deviation that is a distance from a lane center to the center of the vehicle in the vehicle width direction.

The image recognition ECU 13 performs predetermined pattern matching for the distance image information to recognize three-dimensional objects such as guardrails along the road, curbstones, and surrounding vehicles. In the recognition of three-dimensional objects, the image recognition ECU 13 recognizes, for example, types of the three-dimensional objects, heights of the three-dimensional objects, distances from the three-dimensional objects, speeds of the three-dimensional objects, relative speeds between the three-dimensional objects and the vehicle, and relative distances between the three-dimensional objects (for example, a lateral distance between a roadside curbstone and a lane line nearby).

Various types of information recognized by the image recognition ECU 13 are output to the traveling ECU 14 as first surrounding environment information.

In one embodiment, the image recognition ECU 13 of the drive assist apparatus 1 may serve as a surrounding environment recognition device configured to recognize a first surrounding environment around the vehicle in cooperation with the stereo camera 11 and the IPU 12.

The traveling ECU 14 is a control unit that centrally controls the drive assist apparatus 1. Various control units such as a cockpit control unit (CP_ECU) 21, an engine control unit (E/G_ECU) 22, a transmission control unit (T/M_ECU) 23, a brake control unit (BK_ECU) 24, and a power steering control unit (PS_ECU) 25 are coupled to the traveling ECU 14 via an internal communication network such as a controller area network (CAN).

Various sensors such as a locator unit 36, on-board radar devices 37 (right front side sensor 37rf, left front side sensor 37lf, right rear side sensor 37rr, and left rear side sensor 37lr), and a rear sensor 38 are coupled to the traveling ECU 14.

A human-machine interface (HMI) 31 disposed near a driver's seat is coupled to the CP_ECU 21. For example, the HMI 31 includes a switch for giving instructions to execute various types of drive assist control, a mode selection switch for switching driving modes, a steering touch sensor that detects a steering wheel holding state of a driver, a driver monitoring system (DMS) that performs facial authentication of the driver and detects a line of sight, a touch panel display, a combination of meters, and a loudspeaker. In one embodiment, the touch panel display may serve as a display panel.

In response to a control signal from the traveling ECU 14, the CP_ECU 21 notifies the driver as appropriate by display and sound through the HMI 31 about various types of information related to, for example, various alerts for a preceding vehicle, the status of the drive assist control, and the surrounding environment around the vehicle. The CP_ECU 21 outputs, to the traveling ECU 14, various types of information input by the driver through the HMI 31, such as ON/OFF operations on various types of drive assist control.

For example, a throttle actuator 32 of an electronically controlled throttle is coupled to an output side of the E/G_ECU 22. Various sensors such as an accelerator sensor (not illustrated) are coupled to an input side of the E/G_ECU 22.

The E/G_ECU 22 controls drive of the throttle actuator 32 based on, for example, a control signal from the traveling ECU 14 or detection signals from various sensors. Thus, the E/G_ECU 22 adjusts the intake amount of an engine to generate desired engine power. The E/G_ECU 22 outputs, to the traveling ECU 14, signals of an accelerator operation amount and the like detected by various sensors.

A hydraulic control circuit 33 is coupled to an output side of the T/M_ECU 23. Various sensors such as a shift position sensor (not illustrated) are coupled to an input side of the T/M_ECU 23. The T/M_ECU 23 performs hydraulic control for the hydraulic control circuit 33 based on, for example, a signal of an engine torque estimated by the E/G_ECU 22 and detection signals from various sensors. Thus, the T/M_ECU 23 changes the engine power at a desired speed ratio by operating, for example, friction engagement elements and pulleys in an automatic transmission. The T/M_ECU 23 outputs, to the traveling ECU 14, signals of a shift position and the like detected by various sensors.

A brake actuator 34 for adjusting brake fluid pressures to be output to brake wheel cylinders in individual wheels is coupled to an output side of the BK_ECU 24. Various sensors such as a brake pedal sensor, a yaw rate sensor, a longitudinal acceleration sensor, and a vehicle speed sensor (not illustrated) are coupled to an input side of the BK_ECU 24.

The BK_ECU 24 controls drive of the brake actuator 34 based on a control signal from the traveling ECU 14 or detection signals from various sensors. Thus, the BK_ECU 24 generates, for the wheels as appropriate, braking forces for forcible braking control and yaw rate control on the vehicle. The BK_ECU 24 outputs, to the traveling ECU 14, signals of a brake operation status, a yaw rate, a longitudinal acceleration, a vehicle speed, and the like detected by various sensors.

An electric power steering motor 35 for applying a steering torque of a rotational force from a motor to a steering mechanism is coupled to an output side of the PS_ECU 25. Various sensors such as a steering torque sensor and a steering angle sensor are coupled to an input side of the PS_ECU 25.

The PS_ECU 25 controls drive of the electric power steering motor 35 based on a control signal from the traveling ECU 14 or detection signals from various sensors. Thus, the PS_ECU 25 generates the steering torque for the steering mechanism. The PS_ECU 25 outputs, to the traveling ECU 14, signals of a steering torque, a steering angle, and the like detected by various sensors.

The locator unit 36 includes a GNSS sensor 36a and a high-accuracy road map database (road map DB) 36b.

The GNSS sensor 36a measures the position (latitude, longitude, and altitude) of the vehicle by receiving positioning signals from positioning satellites.

The road map DB 36b is a large-capacity storage medium such as an HDD or an SSD, and stores high-accuracy road map information (dynamic map). For example, the road map DB 36b stores lane width data, lane center position coordinate data, lane azimuth angle data, and speed limits as lane data for use in autonomous driving. The stored lane data includes pieces of data for several-meter intervals in each lane on the road map. The road map DB stores information on various facilities and parking lots. Based on, for example, a request signal from the traveling ECU 14, the road map DB 36b outputs road map information in a set range around the vehicle position measured by the GNSS sensor 36a to the traveling ECU 14 as third surrounding environment information.

In one embodiment, the road map DB 36b of the drive assist apparatus 1 may serve as the surrounding environment recognition device configured to recognize a third surrounding environment around the vehicle in cooperation with the GNSS sensor 36a.

The right front side sensor 37rf, the left front side sensor 37lf, the right rear side sensor 37rr, and the left rear side sensor 37lr constitute the on-board radar devices 37. For example, the sensors are millimeter wave radars.

Each millimeter wave radar detects a three-dimensional object such as a pedestrian or a vehicle traveling side by side and a structure (three-dimensional object such as a curbstone, a guardrail, a wall of a building, or a plant) along a roadside (for example, an end at a road shoulder) by outputting radio waves and analyzing the reflected radio waves from the objects. Each millimeter wave radar also detects a three-dimensional obstacle on a road. For example, each radar detects a width of the three-dimensional object, a position of a representative point of the three-dimensional object (position and distance relative to the vehicle), and a relative speed as specific information related to the three-dimensional object.

For example, the right front side sensor 37*rf* and the left front side sensor 371*f* are disposed on right and left sides of a front bumper. The right front side sensor 37*rf* and the left front side sensor 371*f* detect, as second surrounding environment information, three-dimensional objects in right and left obliquely forward and side areas around the vehicle. Those areas are difficult to recognize from an image captured by the stereo camera 11.

For example, the right rear side sensor 37*rr* and the left rear side sensor 371*r* are disposed on right and left sides of a rear bumper. The right rear side sensor 37*rr* and the left rear side sensor 371*r* detect, as the second surrounding environment information, three-dimensional objects in right and left obliquely rearward and side areas around the vehicle. Those areas are difficult to recognize by the right front side sensor 37*rf* and the left front side sensor 371*f*.

In one embodiment, the on-board radar devices 37 (right front side sensor 37*rf*, left front side sensor 371*f*, right rear side sensor 37*rr*, and left rear side sensor 371*r*) of the drive assist apparatus 1 may serve as the surrounding environment recognition device configured to recognize a second surrounding environment around the vehicle. The pieces of information acquired by the sensors 37*rf*, 371*f*, 37*rr*, and 371*r* are sent to the image recognition ECU 13.

Examples of the rear sensor 38 include a sonar device. For example, the rear sensor 38 is disposed on the rear bumper. The rear sensor 38 detects three-dimensional objects in a rearward area behind the vehicle as fourth surrounding environment information. This area is difficult to recognize by the right rear side sensor 37*rr* and the left rear side sensor 371*r*.

In one embodiment, the rear sensor 38 of the drive assist apparatus 1 may serve as the surrounding environment recognition device configured to recognize a fourth surrounding environment around the vehicle.

Coordinates of the external targets in the first surrounding environment information recognized by the camera unit 10 including the image recognition ECU 13, the third surrounding environment information recognized by the locator unit 36, the second surrounding environment information recognized by the on-board radar devices 37 (right front side sensor 37*rf*, left front side sensor 371*f*, right rear side sensor 37*rr*, and left rear side sensor 371*r*), and the fourth surrounding environment information recognized by the rear sensor 38 are converted by the traveling ECU 14 into coordinates in a three-dimensional coordinate system having its origin at the center of the vehicle.

The traveling ECU 14 has driving modes such as a manual driving mode, a first traveling control mode, a second traveling control mode, and a limp home mode. The traveling ECU 14 can selectively switch the driving modes based on, for example, a status of operation on the mode selection switch of the HMI 31.

The manual driving mode is a driving mode in which the driver is assumed to hold the steering wheel. In this driving mode, the vehicle travels by driving operations of the driver, such as a steering operation, an accelerator operation, and a brake operation.

The first traveling control mode is also a driving mode in which the driver is assumed to hold the steering wheel. That is, the first traveling control mode is a so-called semi-autonomous driving mode or drive assist mode in which the vehicle travels along a target traveling route by combining, for example, adaptive cruise control (ACC), active lane keep centering (ALKC) control, and active lane keep bouncing control as appropriate through control of, for example, the E/G_ECU 22, the BK_ECU 24, and the PS_ECU 25 while reflecting the driving operations of the driver.

The adaptive cruise control (ACC) is basically performed based on the first surrounding environment information input from the image recognition ECU 13. For example, the adaptive cruise control (ACC) is performed based on preceding vehicle information in the first surrounding environment information from the image recognition ECU 13.

The active lane keep centering control and the active lane keep bouncing control are basically performed based on the first surrounding environment information and the third surrounding environment information input from one or more of the image recognition ECU 13 and the locator unit 36. For example, the active lane keep centering control and the active lane keep bouncing control are performed based on lane line information in the third surrounding environment information from the image recognition ECU 13 or the locator unit 36.

The second traveling control mode is an autonomous driving mode that realizes a so-called hands-off function in which the vehicle travels along a target route (route map information) by combining, for example, the adaptive cruise control, the active lane keep centering control, and the active lane keep bouncing control as appropriate through control of, for example, the E/G_ECU 22, the BK_ECU 24, and the PS_ECU 25 without the steering wheel holding by the driver, the accelerator operation, and the brake operation.

In the limp home mode, the vehicle is automatically stopped, for example, at a side strip when the vehicle traveling in the second traveling control mode cannot continue the traveling in this mode and the driver cannot take over the driving operation (that is, the mode cannot be switched to the manual driving mode or the first traveling control mode).

In each of the driving modes described above, the traveling ECU 14 determines whether to execute obstacle avoidance control involving autonomous emergency braking (AEB: collision damage reduction braking) control and emergency steering control in response to recognition of a three-dimensional obstacle such as a preceding vehicle or a fallen object on a vehicle traveling road with a strong possibility of colliding with the vehicle, and executes predetermined control as appropriate.

All or part of the locator unit 36, the image recognition ECU 13, the traveling ECU 14, the CP_ECU 21, the E/G_ECU 22, the T/M_ECU 23, the BK_ECU 24, and the PS_ECU 25 are/is a processor including hardware.

For example, the processor is constituted by known components and their peripheral devices including a central processing unit (CPU), a random access memory (RAM), a read only memory (ROM), a non-volatile memory, a non-volatile storage, and a non-transitory computer readable medium.

The ROM, the non-volatile memory, and the non-volatile storage prestore software programs to be executed by the CPU and fixed data such as data tables. The CPU reads the software programs stored in the ROM and the like and executes the software programs by loading the software programs in the RAM. The software programs implement the functions of the components and units (13, 14, 21 to 25, 36) by referring to various types of data as appropriate.

The processor may be implemented by a semiconductor chip such as a field programmable gate array (FPGA). The components and units (13, 14, 21 to 25, 36) may be implemented by electronic circuits.

The software programs may entirely or partly be recorded as computer program products in a non-transitory computer readable medium such as a portable sheet medium typified by a flexible disk, a CD-ROM, or a DVD-ROM, a card memory, a hard disk drive (HDD), or a solid state drive (SSD).

In one embodiment, a monocular camera may serve as the surrounding environment recognition device in place of (or in addition to) the stereo camera 11 in the camera unit 10. In one embodiment, a light detection and ranging (LiDAR) sensor may serve as the surrounding environment recognition device in place of (or in addition to) the on-board radar devices 37.

Operations of the drive assist apparatus 1 of this embodiment are described with reference to FIG. 2 to FIG. 4.

The drive assist apparatus 1 of this embodiment has a function of assisting driving operations of the driver by executing, for example, the adaptive cruise control (ACC), the active lane keep centering (ALKC) control, and the active lane keep bouncing (ALKB) control.

The drive assist apparatus 1 of this embodiment also has a function of assisting the driving by executing the obstacle avoidance control in response to recognition of an obstacle on a traveling road. In this case, the drive assist apparatus 1 of this embodiment determines whether the recognized obstacle has no possibility of hindering the traveling of the vehicle. When determination is made that the recognized obstacle has no possibility of hindering the traveling of the vehicle, the obstacle avoidance control such as emergency braking is suppressed.

Examples of the objects to be recognized by the drive assist apparatus 1 include various road marks such as lane lines and planar structures such as manholes (hereinafter referred to simply as "lane lines etc."). The planar structures, that is, the lane lines etc. are regarded as having no possibility of hindering the traveling of the vehicle in the related-art drive assist apparatuses.

There are three-dimensional objects on roads, such as permanently installed stationary objects typified by roadside curbstones, guardrails, traffic signs, utility poles, and billboards, and moving objects typified by pedestrians, bicycles, other vehicles, and animals. Further, there are various three-dimensional objects on roads, such as temporarily installed stationary objects typified by signage and traffic cones near construction sites, and objects that have fallen from luggage spaces of other vehicles. Those three-dimensional objects are recognized as objects that may hinder the traveling of the vehicle. Those three-dimensional objects are hereinafter referred to collectively as "obstacles etc."

For example, empty plastic bags may float in the air due to wind or the like because of their small mass (hereinafter referred to as "airborne objects"). The airborne objects are three-dimensional objects but are recognized as objects having no possibility of hindering the traveling of the vehicle based on their feature information.

Examples of the feature information of the airborne object include such features that the object is present in the air, that is, away from the road surface, the appearance size (area in a recognition image) is very small (minimal), the weight is small and therefore the falling speed is very low (the object falls at a low speed), the object falls not only in the gravity direction (the direction varies upward, downward, rightward, or leftward due to wind or the like and therefore the falling speed may also vary), the appearance size or shape changes while the object is falling (the shape changes due to wind or the like), and the transparency is high (some plastic bags are colorless and transparent).

The feature information of the airborne object can be acquired, for example, from a result of the predetermined image processing performed based on an image acquired by the camera unit 10. In one embodiment, the camera unit 10 that may serve as the surrounding environment recognition device may also serve as a feature information acquirer configured to acquire feature information of a target object in the recognized surrounding environment. The feature information acquired by the feature information acquirer is sent to the traveling ECU 14. In one embodiment, the traveling ECU 14 may serve as a determiner configured to determine whether the target object may hinder the traveling of the vehicle based on the received feature information.

Figure 2:
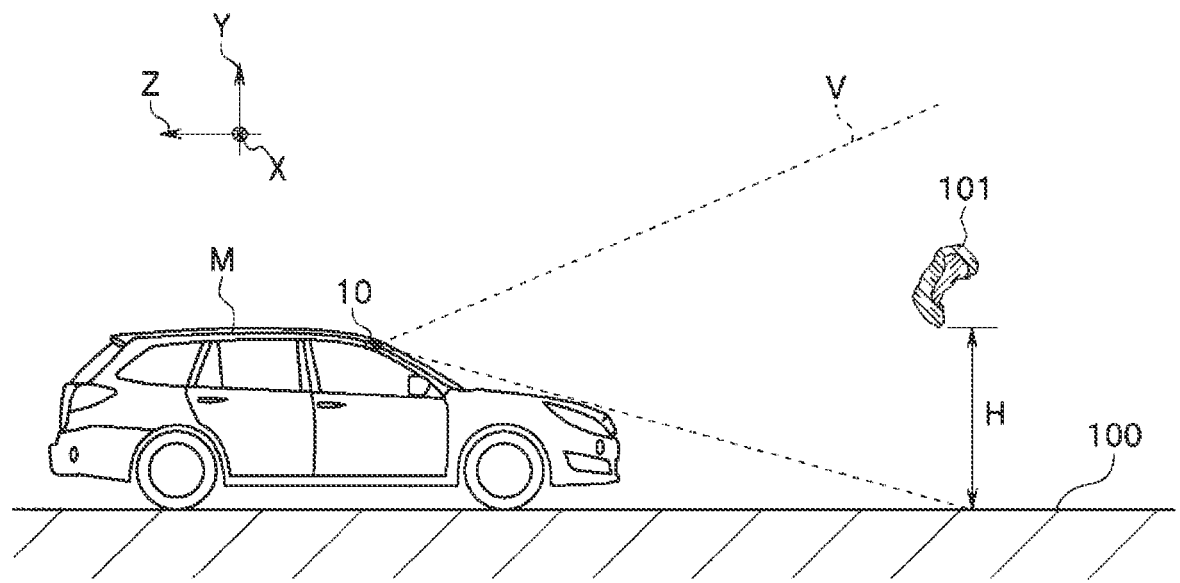
FIG. 2 is a conceptual diagram of how a vehicle including the drive assist apparatus according to the embodiment of the disclosure recognizes obstacles etc. ahead.
Figure 3:
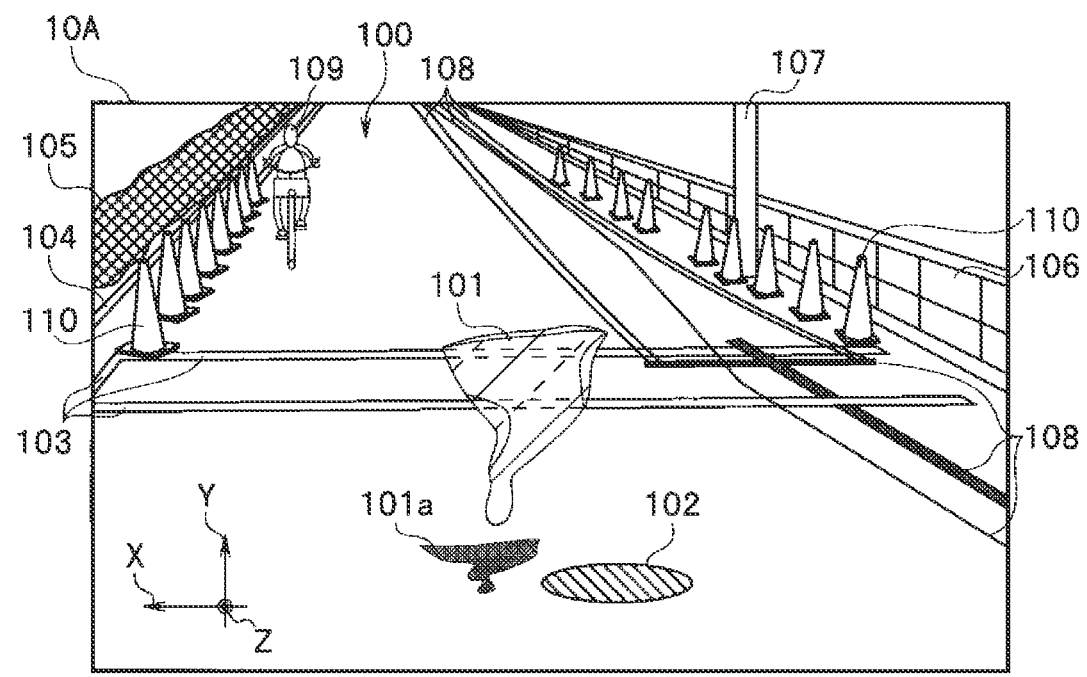
FIG. 3 is a diagram illustrating a display example of a forward image acquired by an on-board camera device of the vehicle including the drive assist apparatus according to the embodiment of the disclosure.

FIG. 2 and FIG. 3 are conceptual diagrams illustrating a situation in which the vehicle including the drive assist apparatus of this embodiment recognizes an object ahead in the traveling direction while traveling on a road.

In FIG. 2, reference symbol 100 represents a road where the vehicle is traveling. In FIG. 2, reference symbol M represents the vehicle including the drive assist apparatus 1. The vehicle M includes the camera unit 10 that may serve as the surrounding environment recognition device and the on-board camera device constituting the drive assist apparatus 1. The camera unit 10 is fixed at a predetermined position in the cabin of the vehicle M. In FIG. 2, reference symbol V represents the field of view (imaging range) of the stereo camera 11 of the camera unit 10. The field of view V corresponds to an angle of view of an image to be acquired by the camera unit 10. FIG. 2 illustrates the field of view V in a height direction.

The vehicle M including the drive assist apparatus 1 is traveling along the road 100. The drive assist apparatus 1 continuously acquires images showing the surrounding environment (forward area in the traveling direction) at predetermined time intervals by using the camera unit 10, and recognizes the surrounding environment by performing the predetermined image processing based on the acquired image data.

An airborne object 101 is present away from the surface of the road 100 (at a height H from the road surface) within a range of the field of view V ahead of the vehicle M in the traveling direction. The drive assist apparatus 1 of the vehicle M recognizes the airborne object 101. FIG. 2 conceptually illustrates this situation.

FIG. 3 illustrates a display example of an image acquired by the camera unit 10 of the drive assist apparatus 1 of the vehicle M in the situation of FIG. 2.

In FIG. 3, reference symbol 10A represents the image acquired by the camera unit 10. The surroundings of the vehicle M (forward area in the traveling direction) are acquired as an image within the range of the image 10A. In FIG. 3, reference symbol 100 represents the road where the vehicle M is traveling as in FIG. 2. Reference symbol 101 represents the airborne object as in FIG. 2. Reference symbol 101a represents the shadow of the airborne object 101. Reference symbol 102 represents a manhole installed on the road 100. Reference symbol 103 represents a mark (marking line) on the road 100. Reference symbol 104 represents a curbstone along the left edge of the road 100. Reference symbol 105 represents a plant or a sidewalk along the left edge of the road 100. Reference symbol 106 represents a boundary wall along the right edge of the road 100. Reference symbol 107 represents a utility pole installed at the right edge of the road 100. Reference symbol 108 represents the shadow of a utility pole or a cable (not illustrated). Reference symbol 109 represents a bicycle traveling toward the vehicle M on the road 100. Reference symbol 110 represents traffic cones placed along the side edges of the road 100.

In FIG. 2 and FIG. 3, arrows X, Y, and Z indicate coordinate axes of a space including the vehicle M. The arrow X indicates a coordinate axis along the width direction of the vehicle M (lateral direction). In a forward view from the vehicle M, a leftward direction of the arrow X is a positive (+) direction. The arrow Y indicates a coordinate axis along the height direction of the vehicle M (vertical direction). In the forward view from the vehicle M, an upward direction of the arrow Y is a positive (+) direction. The arrow Z indicates a coordinate axis along the traveling direction of the vehicle M. A direction of the arrow Z from the forward side to the vehicle M is a positive (+) direction.

The drive assist apparatus 1 recognizes various objects in the surrounding environment around the vehicle M based on image data showing the image 10A.

Operations of the drive assist apparatus 1 of the vehicle M in this situation are described with reference to a flowchart of FIG. 4. The following processing flow shows characteristic processes unique to the embodiment of the disclosure among various processes in the drive assist control to be executed by the drive assist apparatus 1 of this embodiment.

The vehicle M is traveling along the road 100 in an ON state of the drive assist control of the drive assist apparatus 1. The drive assist apparatus 1 continuously recognizes the surrounding environment by using the surrounding environment recognition device (for example, the camera unit 10).

In Step S11 of FIG. 4, the drive assist apparatus 1 checks whether various recognized objects include an object floating in the air (airborne object 101). Whether the recognized object is the airborne object 101 is determined as follows.

For example, as illustrated in FIG. 2, the relative positional relationship between the height position of the sensor (camera unit 10) of the vehicle M and the height position of the target object (airborne object 101) is estimated based on image data. Thus, the height H of the target object (airborne object 101) from the road surface can be calculated. When the height H is equal to or larger than a predetermined threshold, the target object can be estimated as the airborne object 101.

For example, as illustrated in FIG. 3, a check is made as to whether a shadow associated with the target object (airborne object 101) is cast below the target object (on the surface of the road 100) in the image 10A. When the shadow is observed, the target object can be estimated as the airborne object 101.

In Step S12, the drive assist apparatus 1 acquires feature information of the recognized airborne object 101. As described above, the feature information of the airborne object 101 is, for example, information on the size, falling speed, size change amount, and transparency of the airborne object 101. For example, the feature information of the airborne object 101 can be acquired from a result of the predetermined image processing performed based on the image data acquired by the camera unit 10.

The mass and the falling speed of an object have a relationship of "falling speed of object=(object mass×gravitational acceleration)/air resistance". According to this relationship, the falling speed of the object decreases as the mass of the object decreases. In other words, determination can be made that the mass of the object decreases as the falling speed decreases.

In Step S13, the drive assist apparatus 1 checks whether the size of the recognized airborne object 101 (area of an object image in the image 10A) is smaller than a predetermined threshold. When the size of the airborne object 101 (area in the image) is smaller than the predetermined threshold, the process proceeds to Step S14. Otherwise, the process proceeds to Step S18.

In Step S14, the drive assist apparatus 1 checks whether the falling speed of the recognized airborne object 101 is lower than a predetermined threshold. When the falling speed of the airborne object 101 is lower than the predetermined threshold, the process proceeds to Step S15. Otherwise, the process proceeds to Step S18.

In Step S15, the drive assist apparatus 1 checks whether the size of the recognized airborne object 101 is changing. When the size is changing, the drive assist apparatus 1 checks whether the size change amount is equal to or larger than a predetermined threshold. When the size of the airborne object 101 is changing and the size change amount is equal to or larger than the threshold, the process proceeds to Step S16.

When the size of the airborne object 101 is not changing or when the size is changing and the size change amount is smaller than the threshold, the process proceeds to Step S18.

In Step S16, the drive assist apparatus 1 determines the recognized airborne object 101 as an object that the vehicle M can pass even if the object is not regarded as an avoidance target (hereinafter referred to as "passable object").

In Step S17, the drive assist apparatus 1 checks whether the transparency of the recognized airborne object 101 is equal to or higher than a predetermined threshold (high transparency means "close to colorless and transparent").

This check step is provided for the following reason. In general, plastic bags have varying transparencies such as "colorless and transparent", "semi-transparent", and "colored". In view of this fact, the drive assist apparatus 1 of this embodiment checks the transparency of the target object determined as the passable object through the checks under the conditions described above (size, falling speed, and size change) in the processes of Steps S13 to S15. The result showing that the object has a low transparency (colored) serves as a criterion of whether to alert the driver for caution in a process of Step S20. That is, the drive assist apparatus 1 checks that the transparency of the target object is low in the process of Step S17, and adds the result as the criterion of the determination as to whether to give an alert.

The transparency of the target object can be checked by the following method. For example, the pixel value of the target object (airborne object 101) and the pixel value of the surroundings may be compared based on image data acquired by the camera unit 10. Further, reflection of light having passed through the target object (airborne object 101) may be detected and the degree of reflectance may be checked based on surrounding environment data acquired by using the LiDAR sensor or the like.

When the transparency of the airborne object 101 is equal to or higher than the predetermined threshold in the process of Step S17, the reliability of the determination as the passable object increases. In this case, the normal traveling control is continued without taking an action for the avoidance control. Then, the series of processes is finished, and the process returns to the initial step (RETURN).

When the transparency of the airborne object 101 is lower than the predetermined threshold in the process of Step S17, the process proceeds to Step S20.

In Step S20, the drive assist apparatus 1 alerts the driver that the airborne object 101 is present ahead. The alert is a visual alert displayed as an image on the HMI 31 (display panel), or an audio alert given by voice or sound using the HMI 31 (loudspeaker). In one embodiment, the display panel and the loudspeaker of the HMI 31 may serve as a notification device configured to notify the driver about predetermined information. Then, the series of processes is finished, and the process returns to the initial step (RETURN).

The process of Step S20 (alert process) is performed for the following reason. In the process of Step S20, the alert is given about the airborne object 101 identified as the passable object in the processes of Steps S13 to S16 and determined to have a low transparency (lower than the predetermined threshold) in the process of Step S17. This airborne object 101 is the passable object unlikely to hinder the traveling of the vehicle M but may, for example, obstruct the forward view of the vehicle M due to the low transparency. Therefore, when the object is determined as the airborne object 101, no action is taken for the avoidance control but the driver is cautioned.

When the process proceeds to Step S18 from Step S13, S14, or S15, the drive assist apparatus 1 determines in Step S18 that the recognized airborne object 101 is an object that may hinder the traveling of the vehicle M (hereinafter referred to as "impassable object").

In Step S19, the drive assist apparatus 1 executes predetermined emergency braking control. Then, the series of processes is finished, and the process returns to the initial step (RETURN). In this case, the emergency braking control is substantially the same as the control to be performed in response to recognition of general obstacles.

According to the first embodiment described above, when the vehicle M including the drive assist apparatus 1 is traveling along a road while recognizing the surrounding environment ahead in the traveling direction by using the surrounding environment recognition device (10, 37), the feature information of the target object is acquired in the recognized surrounding environment. The traveling control unit 14 determines whether the target object may hinder the traveling of the vehicle M based on the acquired feature information. When determination is made that the target object has no possibility of hindering the traveling of the vehicle M, the normal traveling control for the vehicle M is continued.

With this configuration, when the target object among the recognized three-dimensional objects is the airborne object 101 having no possibility of hindering the traveling of the vehicle M, the obstacle avoidance control can be suppressed. Thus, it is possible to constantly execute smooth drive assist control without causing driver's discomfort.

In this embodiment, the transparency is checked for the object determined as the airborne object 101. When the transparency of the airborne object 101 is lower than the predetermined threshold, the recognized target object is the airborne object 101 but is not transparent (but colored), thereby having a possibility of obstructing the forward view of the vehicle M. In this case, the obstacle avoidance control is suppressed and the driver is cautioned. Thus, the drive assist apparatus 1 of this embodiment can achieve more reliable and smooth traveling control without causing driver's discomfort.

A drive assist apparatus 1 according to a second embodiment of the disclosure is described. The drive assist apparatus 1 of this embodiment basically has a configuration similar to that in the first embodiment, and slightly differs in terms of the processing flow. In the following description, illustration and description are omitted for the configuration of the drive assist apparatus and the situation involving the drive assist apparatus, but FIG. 1 to FIG. 3 are referenced as in the first embodiment. Operations of the drive assist apparatus of this embodiment are described with reference to FIG. 5.

The processing flow of FIG. 5 is executed in the same situation as that in the first embodiment. The processes of Steps S11 and S12 in the processing flow of this embodiment (see FIG. 5) are the same as those in the processing flow of the first embodiment (see FIG. 4). That is, the drive assist apparatus 1 recognizes an airborne object 101 in Step S11 of FIG. 5. In Step S12 of FIG. 5, the drive assist apparatus 1 acquires feature information of the recognized airborne object 101.

In Step S21 of FIG. 5, the drive assist apparatus 1 calculates evaluation values for the individual conditions (size, falling speed, size change, and transparency of the airborne object 101) based on the feature information of the airborne object 101 acquired in the process of Step S12.

The evaluation values of the individual conditions are defined as follows. For example, the evaluation value of the size of the target object is defined on a scale of 0: "small", 1: "medium", and 2: "large". The evaluation value of the falling speed of the target object is defined on a scale of 0: "low", 1: "medium", and 2: "high". The evaluation value of the size change amount of the target object is defined on a scale of 0: "small", 1: "medium", and 2: "large". The evaluation value of each condition is defined in the three levels, but is not limited to this example.

In Step S22, the drive assist apparatus 1 checks whether the total of the evaluation values calculated in the process of Step S21 is smaller than a first threshold. For example, the first threshold is "2". The first threshold is not limited to "2".

When the total evaluation value is smaller than the first threshold of "2", the process proceeds to Step S23. When the total evaluation value is equal to or larger than the first threshold of "2", the process proceeds to Step S24.

In Step S23, the drive assist apparatus 1 determines the recognized airborne object 101 as a passable object. This processing step is the same as Step S16 of FIG. 4.

In Step S24, the drive assist apparatus 1 checks whether the total of the evaluation values calculated in the process of Step S21 is equal to or larger than a second threshold. For example, the second threshold is "5". The second threshold is not limited to "5".

When the total evaluation value is equal to or larger than the second threshold of "5", the process proceeds to Step S25. When the total evaluation value is smaller than the second threshold of "5", the process proceeds to Step S27.

That is, when the process proceeds to Step S27 from Step S24, the total evaluation value is equal to or larger than the first threshold of "2" and smaller than the second threshold of "5" (the total evaluation value is 2 to 4).

In Step S27, the drive assist apparatus 1 checks whether the transparency of the recognized airborne object 101 is equal to or higher than the predetermined threshold. When the transparency of the airborne object 101 is equal to or higher than the predetermined threshold, the normal traveling control is continued without taking an action for the avoidance control. Then, the series of processes is finished, and the process returns to the initial step (RETURN). When the transparency of the airborne object 101 is lower than the predetermined threshold, the process proceeds to Step S28. The process of Step S27 is the same as Step S17 of FIG. 4.

In Step S28, the drive assist apparatus 1 alerts the driver that the airborne object 101 is present ahead. Then, the series of processes is finished, and the process returns to the initial step (RETURN). The process of Step S28 is the same as Step S20 of FIG. 4.

When the total evaluation value is equal to or larger than the second threshold in the process of Step S24, the process proceeds to Step S25. In Step S25, the drive assist apparatus 1 determines the recognized airborne object 101 as an impassable object. The process of Step S25 is the same as Step S18 of FIG. 4.

In Step S26, the drive assist apparatus 1 executes predetermined emergency braking control. Then, the series of processes is finished, and the process returns to the initial step (RETURN). The process of Step S26 is the same as Step S19 of FIG. 4.

According to the second embodiment described above, the same effects as those of the first embodiment can be attained. According to this embodiment, the evaluation values are calculated for the individual conditions (size, falling speed, size change, and transparency of the airborne object 101) based on the feature information of the airborne object 101, and determination is made as to whether the object is the passable object based on the total evaluation value. Thus, it is possible to make more reliable determination.

The embodiment of the disclosure is not limited to the embodiments described above, and various modifications and applications may be made without departing from the gist of the disclosure. The embodiments include various aspects of the disclosure that may be extracted by any appropriate combination of the disclosed constituent elements. For example, some of the constituent elements in the embodiments may be omitted as long as the problems described above can be solved and the effects described above can be attained. The constituent elements of different embodiments may be combined as appropriate. The embodiment of the disclosure is limited to the appended claims but not limited to specific modes of implementation.

According to the embodiments of the disclosure, it is possible to provide the vehicle drive assist apparatus configured to perform the drive assist control for avoiding collision with obstacles etc. based on the surrounding environment information acquired by using the on-board camera device and the like, and configured not to immediately execute the obstacle avoidance control including the emergency braking control when the airborne object or the like is recognized during the traveling of the vehicle, thereby constantly executing smooth traveling control without causing driver's discomfort.

The traveling ECU 14 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the traveling ECU 14. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A vehicle drive assist apparatus to be applied to a vehicle, the vehicle drive assist apparatus being configured to execute at least emergency braking control for avoiding collision of the vehicle with a recognized object, the vehicle drive assist apparatus comprising:
   a surrounding environment recognition device comprising:
      a recognizer configured to recognize a surrounding environment around the vehicle; and
      a feature information acquirer configured to acquire feature information of a-target object in the recognized surrounding environment, wherein the feature information includes a transparency of the target object; and
   a traveling control unit configured to:
      determine, based on the acquired feature information, whether the target object has a possibility of hindering traveling of the vehicle, wherein determining whether the target object has the possibility of hindering traveling of the vehicle includes determining whether the transparency of the target object is lower than a predetermined threshold based on the acquired information including the transparency of the target object; and
      continue traveling control for the vehicle when the target object is determined to have no possibility of hindering the traveling of the vehicle.

2. The vehicle drive assist apparatus according to claim 1, wherein the surrounding environment recognition device is a stereo camera.

3. The vehicle drive assist apparatus according to claim 2, wherein the feature information of the target object comprises:
   information related to a size of the target object;
   information related to a falling speed of the target object; and
   information related to a size change amount of the target object.

4. The vehicle drive assist apparatus according to claim 3, further comprising a notification device configured to notify a driver who drives the vehicle about predetermined information, and
   wherein the notification device is configured to notify the driver about predetermined alert information when the transparency of the target object is determined to be lower than a predetermined threshold based on the acquired information related to the transparency.

5. The vehicle drive assist apparatus according to claim 4, wherein the notification device comprises one or both of a display panel and a loudspeaker.

6. The vehicle drive assist apparatus according to claim 2, further comprising a notification device configured to notify a driver who drives the vehicle about predetermined information, and
   wherein the notification device is configured to notify the driver about predetermined alert information when the transparency of the target object is determined to be lower than a predetermined threshold based on the acquired information related to the transparency.

7. The vehicle drive assist apparatus according to claim 6, wherein the notification device comprises one or both of a display panel and a loudspeaker.

8. The vehicle drive assist apparatus according to claim 1, wherein the feature information of the target object comprises:
   information related to a size of the target object;
   information related to a falling speed of the target object; and
   information related to a size change amount of the target object.

9. The vehicle drive assist apparatus according to claim 8, further comprising a notification device configured to notify a driver who drives the vehicle about predetermined information, and
wherein the notification device is configured to notify the driver about predetermined alert information when the transparency of the target object is determined to be lower than a predetermined threshold based on the acquired information related to the transparency.

10. The vehicle drive assist apparatus according to claim 9, wherein the notification device comprises one or both of a display panel and a loudspeaker.

11. The vehicle drive assist apparatus according to claim 1, further comprising a notification device configured to notify a driver who drives the vehicle about predetermined information, and
wherein the notification device is configured to notify the driver about predetermined alert information when the transparency of the target object is determined to be lower than a predetermined threshold based on the acquired information related to the transparency.

12. The vehicle drive assist apparatus according to claim 11, wherein the notification device comprises one or both of a display panel and a loudspeaker.

13. A vehicle drive assist apparatus to be applied to a vehicle, the vehicle drive assist apparatus being configured to execute at least emergency braking control for avoiding collision of the vehicle with a recognized object, the vehicle drive assist apparatus comprising:
a surrounding environment recognition device comprising a sensor and configured to
recognize a surrounding environment around the vehicle, and
acquire feature information of a target object in the recognized surrounding environment, wherein the feature information includes a transparency of the target object; and
circuitry configured to
determine, based on the acquired feature information whether the target object has a possibility of hindering traveling of the vehicle, wherein determining whether the target object has the possibility of hindering traveling of the vehicle includes determining whether the transparency of the target object is lower than a predetermined threshold based on the acquired information including the transparency of the target object, and
upon determining that the target object is has no possibility of hindering the traveling of the vehicle, continue traveling control for the vehicle.

14. The vehicle drive assist apparatus according to claim 13, further comprising a notification device configured to notify a driver who drives the vehicle about predetermined information, and
wherein the notification device is configured to notify the driver about predetermined alert information when the transparency of the target object is determined to be lower than a predetermined threshold based on the acquired information related to the transparency.

* * * * *